(12) United States Patent
Mikuriya et al.

(10) Patent No.: US 7,692,856 B2
(45) Date of Patent: Apr. 6, 2010

(54) FOCUS ERROR DETECTING OPTICAL SYSTEM FOR A MICROSCOPE

(75) Inventors: Kenta Mikuriya, Tokyo (JP); Takayuki Kei, Tokyo (JP); Yasunori Yokoyama, Tokyo (JP); Naomichi Chida, Tokyo (JP); Yoshiaki Naganuma, Kanagawa (JP)

(73) Assignee: Yokogawa Electric Corporation, Tokyo (JP)

( * ) Notice: Subject to any disclaimer, the term of this patent is extended or adjusted under 35 U.S.C. 154(b) by 333 days.

(21) Appl. No.: 11/730,438

(22) Filed: Apr. 2, 2007

(65) Prior Publication Data

US 2007/0236687 A1      Oct. 11, 2007

(30) Foreign Application Priority Data

Mar. 31, 2006   (JP)   ............. P.2006-098090
Mar. 31, 2006   (JP)   ............. P.2006-098091

(51) Int. Cl.
   *G02B 21/00*   (2006.01)
(52) U.S. Cl. ................... 359/383; 250/201.3
(58) Field of Classification Search ........ 359/368, 359/383; 250/201.2, 201.3
   See application file for complete search history.

(56) References Cited

U.S. PATENT DOCUMENTS

| 4,246,476 A | * | 1/1981 | Stauffer ............ 250/201.2 |
| 4,908,504 A | * | 3/1990 | Karasaki et al. ........ 250/201.2 |
| 5,260,825 A | | 11/1993 | Nagano et al. |
| 2004/0113043 A1 | | 6/2004 | Ishikawa et al. |

FOREIGN PATENT DOCUMENTS

DE    34-46-727 A1   7/1986
JP     5-88072 A     4/1993

* cited by examiner

*Primary Examiner*—Alessandro Amari
(74) *Attorney, Agent, or Firm*—Sughrue Mion, PLLC (57) ABSTRACT

A focus error detecting optical system has an optical parameter which makes a focus lock-in range by a focus error signal be a value capable of detecting focus on a front surface of a cover glass and focus on a back surface thereof separately. A control section, based on the focus error signal obtained by the focus error detecting optical system, brings a focal point of an observational optical system to a focus position. Further, focus error detecting optical systems include optical units each having an optical parameter corresponding to a numerical aperture of respective objective lenses. A control section selects the optical unit of the focus error detecting optical system corresponding to the objective lens in use. The control section, using a focus error signal obtained by the selected focus error detecting optical system, brings a focal point of an observational optical system to a focus position.

3 Claims, 6 Drawing Sheets

FOCUS ERROR DETECTING OPTICAL SYSTEM FOR A MICROSCOPE

This application claims foreign priorities based on Japanese Patent application No. 2006-098090, filed Mar. 31, 2006, and Japanese Patent application No. 2006-098091, filed Mar. 31, 2006, the contents of which are incorporated herein by reference in their entireties.

BACKGROUND OF THE INVENTION

1. Field of the Invention

The present invention relates to a microscope or a biological microscope having an auto-focus function for an observational optical system using a focus error signal.

2. Description of the Related Art

An auto-focus device has been known, which executes automatic focus control by driving an objective lens of a microscope by an actuator. This device detects a focus error from a focal point of the objective lens of the microscope, moves the objective lens by the actuator such as a piezoelectric element according to a detection signal of the focal shift, and performs focusing (refer to JP-A-5-88072, for example).

Such the auto-focus device enables auto-focus on a surface of an object to be observed in a case where surface observation is performed by a metallurgical microscope or the like. However, a microscope such as a biological microscope has specialty of observing the object to be observed through a cover glass. In the related art auto-focus device, although the auto-focus onto the surface of the cover glass is possible, the auto-focus onto the object to be observed, such as a cell, which is placed inside the cover glass is impossible. Further, in a case where an oil immersion lens is used as an objective lens, light reflection does not occur at a boundary between the cover glass and oil, so that even the focus onto the surface of the cover glass becomes impossible.

Furthermore, in such the auto-focus device of the related art, a detection optical system for obtaining the detection signal includes an objective lens. Therefore, in a microscope using a plurality of objective lenses, when the objective lens in use is switched, its numerical aperture changes, so that an appropriate detection signal cannot be obtained. Further, such the microscope cannot deal with the shift of an optical axis due to switching of the objective lens. Further, a biological microscope has specialty of observing an observation object through a cover glass, so that a focus error detecting optical system having high accuracy is required in order to perform auto-focus onto the observation object such as a cell placed inside the cover glass. Therefore, there are circumstances that an appropriate focus error detecting characteristic must be always maintained regardless of the objective lens to be selected.

SUMMARY OF THE INVENTION

The present invention has been made in view of the above circumstances, and provides a biological microscope which enables auto-focus or semi-auto-focus onto an object to be observed that is placed on a back side of a cover glass.

Furthermore, the present invention provides a microscope which can always obtain an appropriate focus error detecting characteristic even though an objective lens in use is switched.

In some implementations, a microscope of the invention comprising:

an observational optical system;

a focus error detecting optical system having an optical parameter which makes a focus lock-in range obtained by a focus error signal be a value capable of detecting a focus on a front surface of a cover glass and a focus on a back surface of the cover glass separately; and a focusing section which brings a focal point of the observational optical system into a focus position of which basis is the back surface of the cover glass, based on the focus error signal obtained from the focus error detecting optical system.

According to the microscope, the focal point of the observational optical system is brought into the focus position of which basis is the back surface of the cover glass. Therefore, auto-focus or semi-auto-focus onto an observation object placed on the back side of the cover glass is possible.

In the microscope, the focusing section brings the focal point of the observational optical system into the focus position by moving the focal point of the observational optical system from the back surface of the cover glass for a predetermined amount.

In the microscope, a focal point to be detected by the focus error detecting optical system and the focal point of the observational optical system are set by being shifted for a predetermined amount, and the focusing section brings the focal point of the observational optical system into the focus position by bringing the focal point of the observational optical system to the back surface of the cover glass in accordance with the focus error signal.

The microscope comprises a focus adjusting section which accepts an input of a value for the predetermined amount.

In some implementations, a microscope of the invention comprising:

an observational optical system;

a focus error detecting optical system;

a light source which emits light for focus error detection on a sample, so as to obtain a focus error signal;

a filter which is provided for the focus error detecting optical system, and cuts off light of an observation image from the sample side; and a focus error signal generation section in the focus error detecting optical system, which receives the light for focus error detection passed through the filter and generates the focus error signal, wherein the focus error signal is used to perform auto-focus of the observational optical system.

According to the microscope, the filter which cuts off light of the observation image from the sample side is provided, and the light for focus error detection passed through the filter is received and the focus error signal is generated. Thus, the exact focus error signal can be obtained.

The microscope comprises a separation section which separates light from the sample side into the light of the observation image and the light for focus error detection, and makes the light of the observation image to be incident on the observational optical system and the light for focus error detection to be incident on the focus error detecting optical system.

In the microscope, an astigmatic method is used in obtaining the focus error signal.

In some implementations, a microscope of the invention comprising:

a plurality of objective lenses in an observational optical system;

a plurality of focus error detecting optical systems each having an optical parameter corresponding to a numerical aperture of the objective lenses respectively;

a selecting section which selects the focus error detecting optical system corresponding to the objective lens being in use; and a focusing section which brings a focal point of the observational optical system into a focus position by using a focus error signal obtained by the selected focus error detecting optical system.

According to the microscope, the focus error detecting optical system corresponding to the objective lens being in use is selected. Thus, even in a case where the objective lens is switched, the optical parameter of the focus error detecting optical system can be always optimized, and an appropriate focus error detecting characteristic is not lost.

In the microscope, each of the focus error detecting optical systems has the optical parameter which makes a focus lock-in range obtained by the focus error signal upon using the corresponding objective lens substantially be a constant value.

In the microscope, each of the focus error detecting optical systems has the optical parameter which makes the focus lock-in range obtained by the focus error signal upon using the corresponding objective lens be the value capable of detecting a focus on a front surface of a cover glass and a focus on a back surface of the cover glass separately.

In the microscope, the focusing section brings the focal point of the observational optical system into the focus position of which basis is the back surface of the cover glass.

DESCRIPTION OF THE PREFERRED EMBODIMENTS

First Embodiment

Referring to FIGS. 1 to 5, a first embodiment of a biological microscope according to the invention will be described below.

Figure 1:
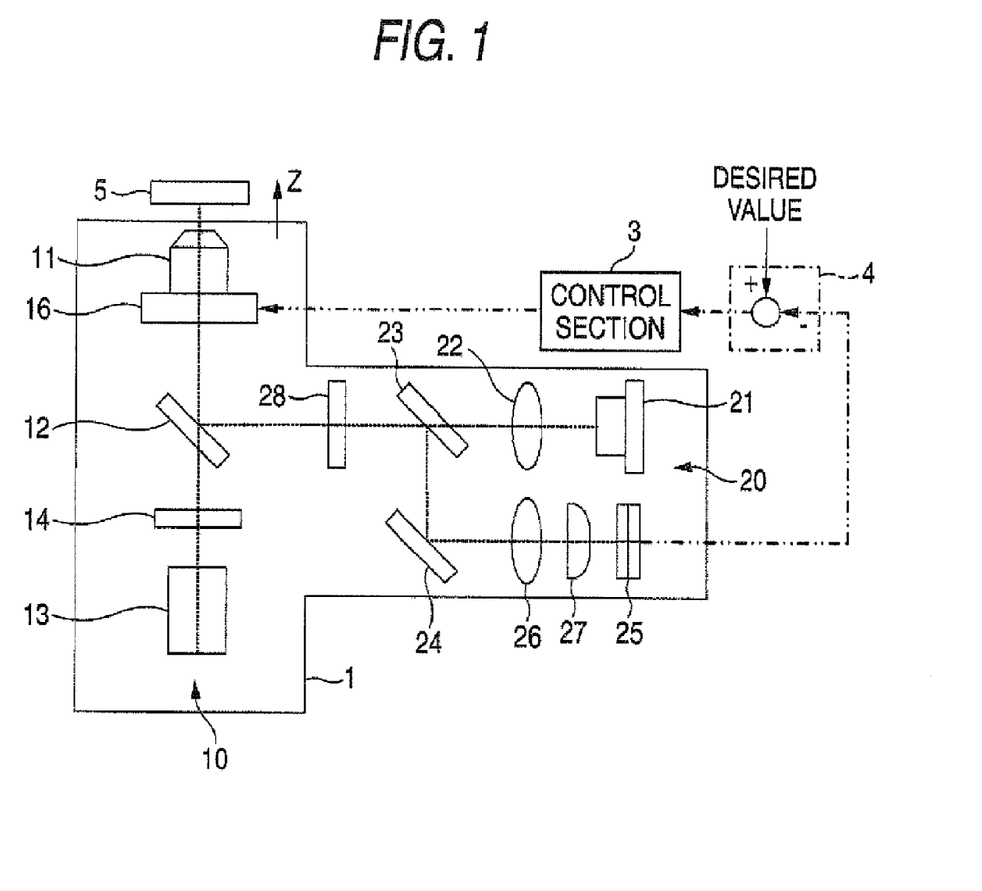
FIG. 1 is a block diagram showing a configuration of a microscope in a first embodiment.

FIG. 1 is a block diagram showing a configuration of the biological microscope in this embodiment.

As shown in FIG. 1, the biological microscope in this embodiment is provided with an optical system 1 including an observational optical system 10 and a focus error detecting optical system 20, a control circuit (control section) 3 for controlling a position of an objective lens 11, and a focus adjusting section 4 for controlling a focal position of the observational optical system.

The optical system 1 includes the objective lens 11 arranged in the vicinity of a sample 5, a dichroic mirror 12 as a separation section which separates light from the sample 5 side into an observation light and a focus error detection light, an observation section 13 which accepts the observation light passed through the dichroic mirror 12, a filter 14 for preventing the focus error detection light from being incident to the observation section 13, a laser diode 21 as a light source for focus error detection, a lens group 22 through which the focus error detection light emitted from the laser diode 21 passes toward the sample 5, a half mirror 23 which reflects a part of the focus error detection light, a mirror 24 which reflects the focus error detection light which has been reflected by the sample 5 and reflected by the half mirror 23, a quadrant photodiode 25 as a focus error signal generation section which receives the focus error detection light, a collimator lens 26 and a cylindrical lens 27 which form a beam shape of the focus error detection light incident on the quadrant photodiode 25 into a predetermined shape, and a filter 28 for cutting off the observation light reflected by the dichroic mirror 12.

As shown in FIG. 1, the objective lens 11 is movable in a z-direction (optical axis direction) by an actuator 16. The actuator 16 is controlled by the control circuit 3.

Next, the operation of the biological microscope in this embodiment will be described.

The observation light from the sample 5 enters the observation section 13 through the objective lens 11, the dichroic mirror 12 and the filter 14, and an observation image of the sample 5 is obtained in the observation section 13. The observational optical system 10 includes these objective lens 11, dichroic mirrors 12, filter 14 and the observation section 13.

On the other hand, the focus error detection light emitted from the laser diode 21 passes through the lens group 22, the half mirror 23 and the filter 28, is reflected by the dichroic mirror 12, and is applied onto the sample 5 through the objective lens 11. The focus error detection light reflected by the sample 5 returns through the objective lens 11 to the dichroic mirror 12, is reflected by the dichroic mirror 12, and enters the filter 28. The focus error detection light passed through the filter 28 is reflected by the half mirror 23 and the mirror 24, and passes through the collimator lens 26 and the cylindrical lens 27. The focus error detection light passed through the collimator lens 26 and the cylindrical lens 27 is received by the quadrant photodiode 25.

The focus error detecting optical system 20 includes these lens group 22, half mirror 23, filter 28, dichroic mirror 12, objective lens 11, mirror 24, quadrant photodiode 25, collimator lens 26 and cylindrical lens 27.

The filter 28 provided for the focus error detecting optical system 20 cuts off the observation light from the sample 5 side, which has not been completely removed by the dichroic mirror 12. In this embodiment, the observation light is cut off by the filter 28 and only the focus error detection light passed through the filter 28 is incident on the quadrant photodiode 25. Therefore, in the quadrant photodiode 25, an exact focus error signal which is not influenced by the observation light can be generated. Further, by removing the influence of the observation light, sensitivity of the focus error detection can be improved. Therefore, the quantity of the focus error detection light applied onto the sample 5 can be reduced, so that a bad influence onto the sample 5 can be prevented when the sample 5 is a living cell or the like.

The collimator lens 26 and the cylindrical lens 27 are orthogonal to the optical axis (z-axis), and make focal lengths differ in two directions (x-direction and y-direction) which are orthogonal to each other. Thus, the focus error detection using an astigmatic method on the basis of the light receiving amount of the quadrant photodiode 25 is possible. As described later, the focus error detecting optical system 20 and the control circuit 3, etc., function as a focusing section.

Figure 2A:
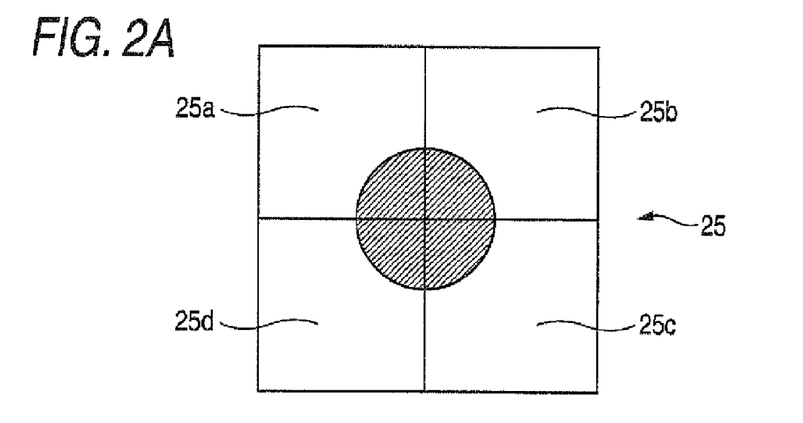
FIG. 2A is a diagram showing a projection shape of a focus error detection light applied onto a quadrant photodiode in focusing time.
Figure 2B:
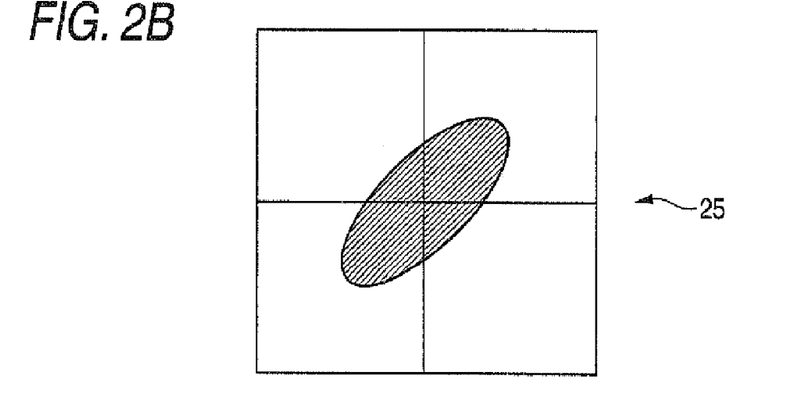
FIG. 2B is a diagram showing a projection shape of a focus error detection light applied onto a quadrant photodiode in a case where a focal point is distant.
Figure 2C:
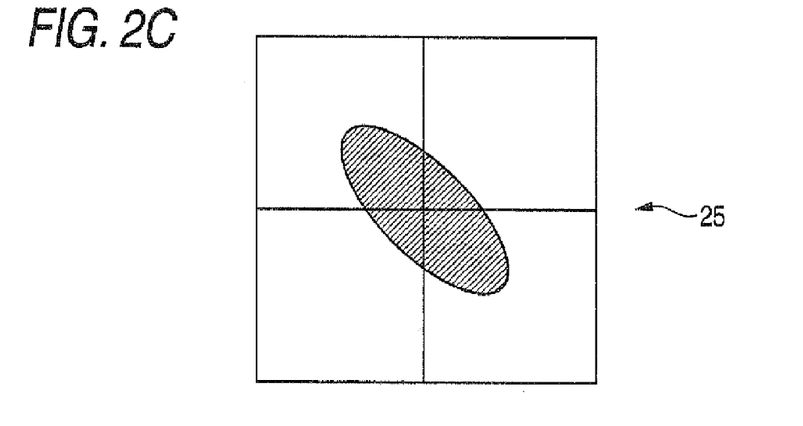
FIG. 2C is a diagram showing a projection shape of a focus error detection light applied onto a quadrant photodiode in a case where a focal point is close.

FIGS. 2A-2C show projection shapes of the focus error detection light applied on the quadrant photodiode 25. FIG. 2A shows a shape in the focusing time, FIG. 2B shows a shape when a focal point is distant, and FIG. 2C shows a shape when the focal point is close. When an output level in an area 25a of the photodiode 25 is taken as "A", an output level in an area 25b thereof is taken as "B", an output level in an area 25c thereof is taken as "C", and an output level in an area 25d thereof is taken as "D", by calculating an expression of "(A+C)−(B+D)", an focus error detection signal can be obtained. In a so-called S-curve of the focus error detection signal, a focusing state is obtained at a point where a signal strength is 0. The focus error detection signal outputted from the quadrant photodiode 25 is given to the control circuit 3 through the focus adjusting section 4. Since the focus error detection by the astigmatic method is a well-known technology, its detailed description is omitted.

Figure 3A:
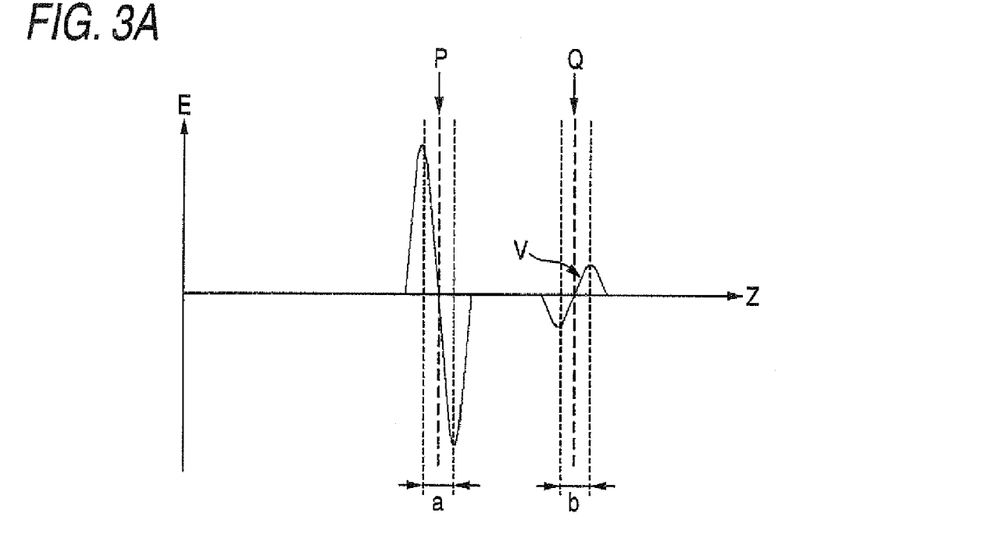
FIG. 3A is a diagram showing an example of a focus error detection signal in the microscope in first and second embodiments.

FIG. 3A is a diagram showing an example of the focus error detection signal obtained by the focus error detecting optical system 20. In a graph shown in FIG. 3A, a longitudinal axis indicates a signal strength E of the focus error detecting signal, and a horizontal axis indicates a focus position Z.

In the example shown in FIG. 3A, at a position shown by an arrow P and at a position shown by an arrow Q, the focusing state is shown respectively. In the figure, a distance between the arrow P and the arrow Q (P−Q) corresponds to the thickness of the cover glass 52, and reference characters a and b are lock-in ranges in the focusing operation (focus lock-in range) respectively.

Figure 4A:
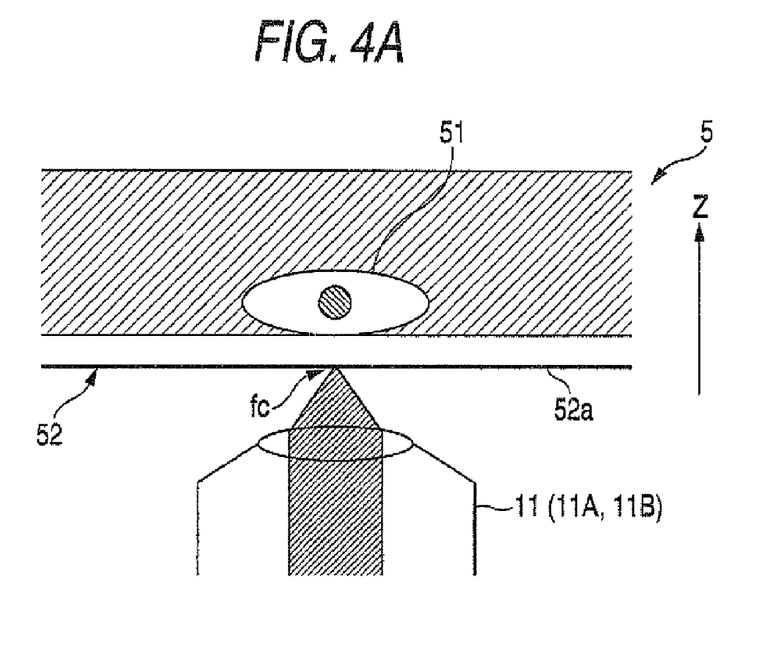
FIG. 4A is a diagram showing a focusing state of an observational optical system on a front surface of a cover glass.
Figure 4B:
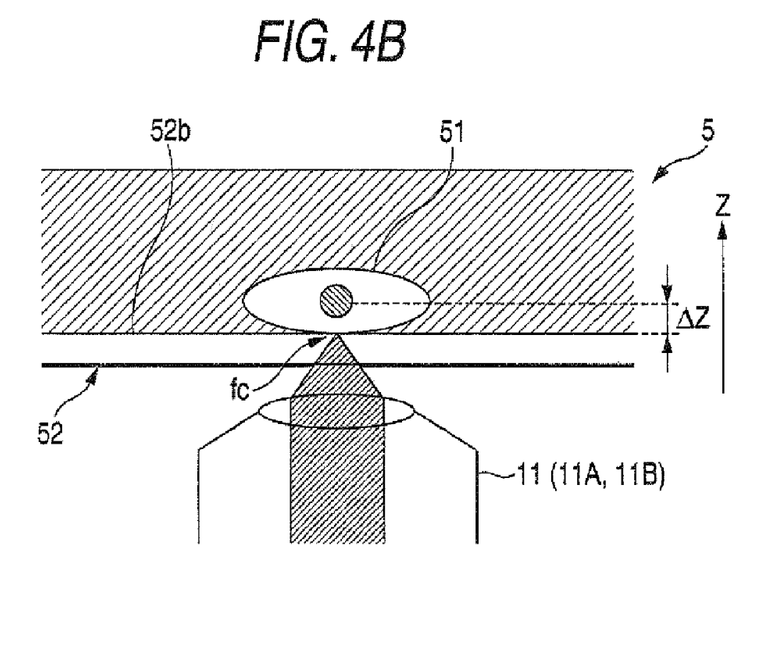
FIG. 4B is a diagram showing a focusing state of an observational optical system on a back surface of the cover glass.

FIGS. 4A and 4B are diagrams showing a state in the focusing time of the observational optical system 10 respectively.

FIG. 4A shows the focusing state at the position of the arrow P in FIG. 3A. In FIG. 4A, a focal point fc of the observational optical system 10 is brought onto a surface 52a of the cover glass 52 placed on the frontward side (on the objective lens 11 side) of an observation object 51 such as a cell.

On the other hand, FIG. 4B shows the focusing state at the position of the arrow Q in FIG. 3A. In FIG. 4B, the focal point fc of the observational optical system 10 is brought onto a back surface 52b of the cover glass 52.

As shown in FIG. 3A, according to the biological microscope in this embodiment, an optical parameter of the focus error detecting optical system 20 is determined so that curves of the focus error detection signals indicating the focusing states onto the front surface 52a and the back surface 52b of the cover glass 52 are separate from each other. Therefore, focus of the observational optical system 10 can be obtained on the back surface 52b of the cover glass 52 exactly. Further, in a case where an oil immersion lens is used as the objective lens 11, the curve of the focus error detection signal indicating the focusing state onto the surface 52a of the cover glass 52 does not appear. However, by using the curve of the focus error detection signal indicating the focusing state onto the back surface 52b of the cover glass 52, focusing onto the back surface 52b of the cover glass 52 is naturally possible.

Here, the thickness of the cover glass 52 is usually about 170 μm. Accordingly, it is desirable that the optical parameter of the focus error detecting optical system 20 is determined so that the focus lock-in range in the focus error detecting optical system 20, that is, a width in which feedback control by the S-curve of the focus error detection signal is possible, be in a range from about 17 μm to 34 μm. It is preferable that the focus lock-in range is about 0.1 to 0.2 times the thickness of the cover glass 52.

Figure 3B:
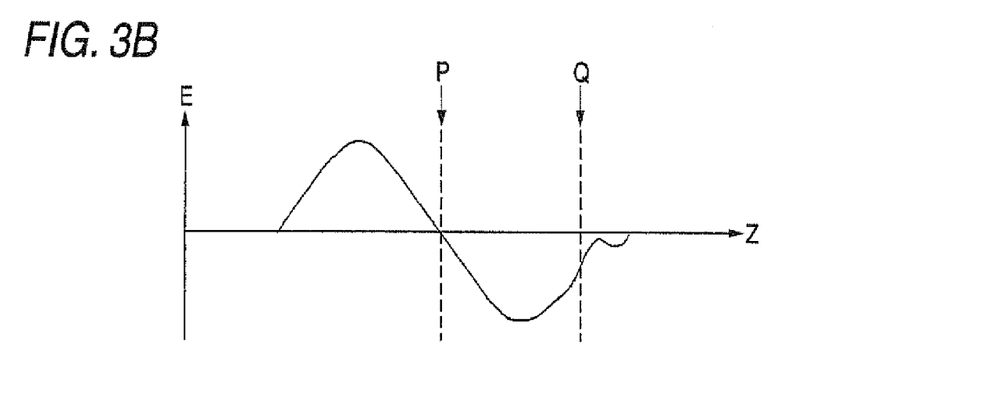
FIG. 3B is a diagram showing an example of a focus error detection signal in the microscope of the related art or in the microscope in which the common optical system is used.

To the contrary, FIG. 3B shows an example of the focus error detection signal in a case where the sample 5 is observed by a related art microscope. In this case, since the focus lock-in range and the thickness of the cover glass are almost identical (about 1 times), a curve indicating focusing onto the back surface 52b of the cover glass 52 is absorbed in a curve of a great amplitude indicating focusing onto the front surface 52a of the cover glass 52, so that the focusing state onto the back surface 52b cannot be detected.

Next, a procedure of making the observational optical system 10 focus on the observation object 51 will be described. This procedure is executed by the control circuit 3.

In the biological microscope in this embodiment, firstly, the focal point fc of the observational optical system 10 is brought onto the back surface 52b of the cover glass 52 (FIG. 4B). Here, the feedback control on the basis of the focus error detection signal is executed by the control circuit 3, and the objective lens 11 is driven by the actuator 16 along the Z-axis, whereby the focal point fc is brought onto the back surface 52b of the cover glass 52. In this case, for example, after the objective lens 11 has been brought close to the cover glass 52, and the focus onto the front surface 52a of the cover glass 52 is obtained, focusing may be performed onto the back surface 52b. According to this method, in the second focusing state, the focal point fc is brought onto the back surface 52b of the cover glass 52.

Figure 5:
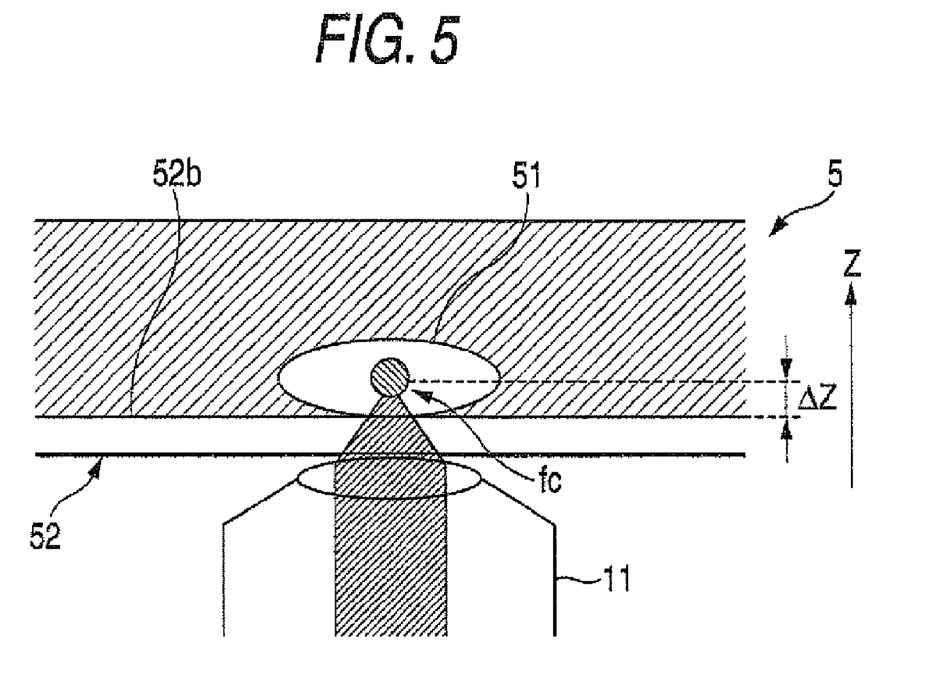
FIG. 5 is a diagram showing a state in which the observational optical system is focused on an observation object.

Next, as shown in FIG. 4B, the objective lens 11 is pushed along the Z-axis for the predetermined amount ΔZ (for example, about 1 to 10 μm), thereby to bring the focal point fc onto the observation object 51. The control circuit 3 drives the actuator 16 to move the objective lens 11 from the focus position for the amount ΔZ along the Z-axis direction. Hereby, as shown in FIG. 5, the focal point fc is brought onto the observation object 51.

Further, by inputting a desired value V to the focus adjusting section 4 shown in FIG. 1, the feedback control of the focal point fc during observation is possible. As the desired value V, a focus error detection signal value corresponding to ΔZ may be given to the focus adjusting section 4 (refer to FIG. 3A). In this case, since the focus position is always feedback-controlled by the control circuit 3 so that the focus error detection signal value coincides with the desired value V, even in a case where the focal point on the observation object 51 changes with time, the focusing state can be always maintained.

An operator, while confirming the observation image, can change the desired value V to be inputted to the focus adjusting section 4, and the input of the appropriate desired value V makes it possible to obtain the stable observation image.

In this embodiment, the focal point fc of the observational optical system 10 is completely matched with the focal point of the focus error detecting optical system 20. Therefore, in accordance with the desired value V inputted to the focus adjusting section 4, the focal point fc of the observational optical system 10 is moved (deepened) from the back surface 52b of the cover glass 52 for AZ, whereby the focal point fc is brought onto the observation object 51. However, the focal point detected by the focus error detecting optical system 20 and the focal point of the observational optical system 10 may be previously set to be shifted for a predetermined amount (for example, ΔZ). Hereby, by focusing the focus error detection light on the back surface 52b of the cover glass 52 in accordance with the focus error signal, the focal point fc of the observational optical system 10 is actually brought onto the observation object 51. By feedback-controlling the focus position by the control circuit 3 at all times, even in a case where the focal point on the observation object 51 changes with time, the focusing state can be always maintained.

By providing a physical adjusting portion for adjusting the above predetermined amount in the focus error detecting optical system 20, the predetermined amount can be optically changed in a margin to be adjusted of the adjusting portion. For example, by making the collimator lens 26, the cylindrical lens 27, or the quadrant photodiode 25 movable in the optical axis direction, the shift amount between the focus position detected by the focus error detecting optical system 20, and the actual position of the focal point fc of the observational optical system 10 can be adjusted optically.

Further, by using both the optical shift amount between the focus position detected by the focus error detecting optical system 20 and the focal point fc of the observational optical system 10, and the desired value V inputted to the focus adjusting section 4, the focal point fc may be adjusted.

Since the astigmatic method is resistant to pattern change of field of view, it is suited to an auto-focus in a case where an observation object such as a living cell moves. Further, since the astigmatic method is generally high in sensitivity of focus error detection and the laser intensity of the focus error detection light can be small, an influence onto the observation object can be reduced, and quality of the observation image can be improved. However, the invention is applied also in a case where the astigmatic method is not used.

As described above, according to the biological microscope of the invention, the focal point of the observational optical system is brought into the focus position of which basis is the back surface of the cover glass. Therefore, auto-focus or semi-auto-focus onto an observation object placed on the back side of the cover glass is possible. Further, according to the biological microscope of the invention, the filter which cuts off light of the observation image from the sample side is provided, and the light for focus error detection passed through the filter is received and the focus error signal is generated. Thus, the exact focus error signal can be obtained.

Second Embodiment

Referring to FIGS. 2A to 4B and FIG. 6, second embodiment in which a microscope of the invention is applied to a biological microscope will be described below.

Figure 6:
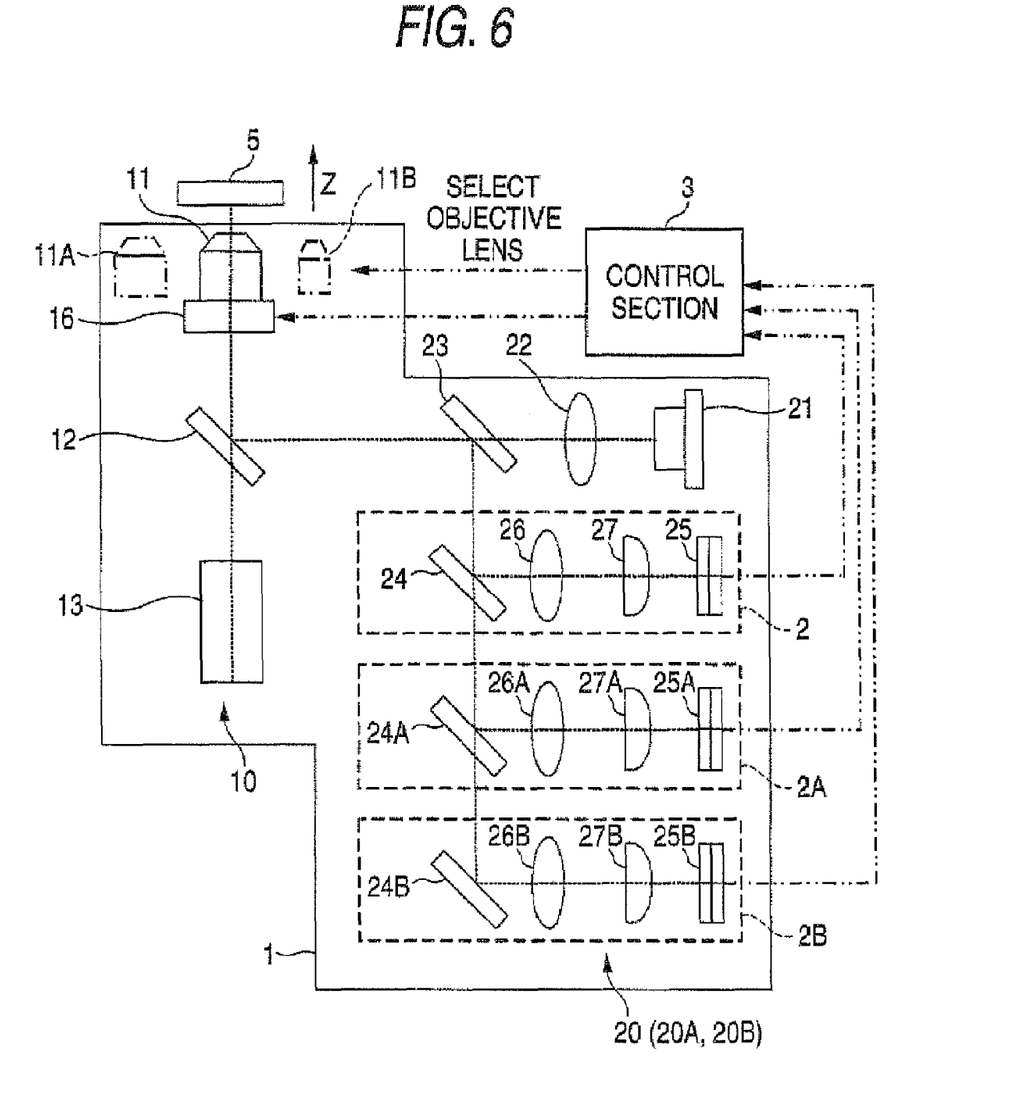
FIG. 6 is a block diagram showing a configuration of a microscope in a second embodiment.

FIG. 6 is a block diagram showing a configuration of the microscope in the second embodiment.

As shown in FIG. 6, the microscope in this embodiment is provided with an optical system 1 including an observational optical system 10 and focus error detecting optical systems 20, 20A and 20B, and a control section 3 for controlling each section of the microscope.

The optical system 1 includes: an objective lens 11, an objective lens 11A and an objective lens 11B which are arranged in the vicinity of a sample 5; a dichroic mirror 12 which separates the light from the sample 5 side into an observation light and a focus error detection light; an observation section 13 which accepts the observation light passed through the dichroic mirror 12; a laser diode 21 as a light source for focus error detection; a lens group 22 through which the focus error detection light emitted from the laser diode 21 passes toward the sample 5; a half mirror 23 which reflects a part of the focus error detection light; an optical unit 2 which is optimized for the objective lens 11; an optical unit 2A which is optimized for the objective lens 11A; and an optical unit 2B which is optimized for the objective lens 11B.

The optical unit 2 includes a half mirror 24 which reflects the focus error detection light which has been reflected by the sample 5 and reflected by the half mirror 23, a quadrant photodiode 25 which receives the focus error detection light and generates a focus error signal, and a collimator lens 26 and a cylindrical lens 27 which form a beam shape of the focus error detection light incident on the quadrant photodiode 25 into a predetermined shape.

The optical unit 2A includes a half mirror 24A which reflects the focus error detection light which has been reflected by the sample 5, reflected by the half mirror 23 and passed through the half mirror 24, a quadrant photodiode 25A which receives the focus error detection light and generates a focus error signal, and a collimator lens 26A and a cylindrical lens 27A which form a beam shape of the focus error detection light incident on the quadrant photodiode 25 into a predetermined shape.

The optical unit 2B includes a mirror 24B which reflects the focus error detection light which has been reflected by the sample 5, reflected by the half mirror 23 and passed through the half mirrors 24 and 24A, a quadrant photodiode 25B which receives the focus error detection light and generates a focus error signal, and a collimator lens 26B and a cylindrical lens 27B which form a beam shape of the focus error detection light incident on the quadrant photodiode 25 into a predetermined shape.

As shown in FIG. 1, the objective lens 11, the objective lens 11A and the objective lens 11B are selectively used, and the objective lens to be used is selected by the control section 3. The selected objective lens is movable in a z-direction (optical axis direction) by an actuator 16. The actuator 16 is controlled by the control section 3.

Further, the optical unit 2 is provided correspondingly to the objective lens 11, the optical unit 2A is provided correspondingly to the objective lens 11A, and the optical unit 2B is provided correspondingly to the objective lens 11B. The optical unit 2, the optical unit 2A, and the optical unit 2B are selectively used correspondingly to the objective lens to be used. That is, when the objective lens 11 is used, the optical unit 2 is used; when the objective lens 11A is used, the optical unit 2A is used; and when the objective lens 11B is used, the optical unit 2B is used.

Next, the operation of the microscope in this embodiment will be described. Here, the objective lens 11 and the optical unit 2 are used.

The observation light from the sample 5 enters the observation section 13 through the objective lens 11 and the dichroic mirror 12, and an observation image of the sample 5 is obtained in the observation section 13. The observational optical system 10 includes these objective lens 11, dichroic mirrors 12 and the observation section 13.

On the other hand, the focus error detection light emitted from the laser diode 21 passes through the lens group 22 and the half mirror 23, is reflected by the dichroic mirror 12, and is applied onto the sample 5 through the objective lens 11. The focus error detection light reflected by the sample 5 returns through the objective lens 11 to the dichroic mirror 12, is reflected. Then, the focus error detection light is reflected by the half mirror 23 and the half mirror 24, and passes through the collimator lens 26 and the cylindrical lens 27. The focus error detection light passed through the collimator lens 26 and the cylindrical lens 27 is received by the quadrant photodiode 25.

The focus error detecting optical system 20 includes these lens group 22, half mirror 23, dichroic mirror 12, objective lens 11, half mirror 24, quadrant photodiode 25, collimator lens 26 and cylindrical lens 27.

The collimator lens 26 and the cylindrical lens 27 are orthogonal to the optical axis (z-axis), and make focal lengths differ in two directions (x-direction and y-direction) which are orthogonal to each other. Thus, the focus error detection using an astigmatic method on the basis of the light receiving amount of the quadrant photodiode 25 is possible. As described later, the focus error detecting optical system 20 and the control section 3, etc., function as a focusing section.

FIGS. 2A-2C show projection shapes of the focus error detection light applied on the quadrant photodiode 25. FIG. 2A shows a shape in the focusing time, FIG. 2B shows a shape when a focal point is distant, and FIG. 2C shows a shape when the focal point is close. When an output level in an area $25a$ of the photodiode 25 is taken as "A", an output level in an area $25b$ thereof is taken as "B", an output level in an area $25c$ thereof is taken as "C", and an output level in an area $25d$ thereof is taken as "D", by calculating an expression of "(A+C)−(B+D)", an focus error detection signal can be obtained. In a so-called S-curve of the focus error detection signal, a focusing state is obtained at a point where a signal strength is 0. The focus error detection signal outputted from the quadrant photodiode 25 is given to the control section 3. The control section 3 control the actuator 16 by feedback control based on the focus error detection signal and drives the objective lens 11. Since the focus error detection by the astigmatic method is a well-known technology, its detailed description is omitted.

In a case where the objective lens 11A is used, the focus error detecting optical system 20A is similarly made up by the optical unit 2A; and in a case where the objective lens 11B is used, the focus error detecting optical system 20B is similarly made up by the optical unit 2B. In the respective focus error detecting optical systems 20A and 20B, a focus error detection signal can be obtained similarly.

FIG. 3A is a diagram showing an example of the focus error detection signal obtained by the focus error detecting optical systems 20, 20A, 20B. In a graph shown in FIG. 3A, a longitudinal axis indicates a signal strength E of the focus error detecting signal, and a horizontal axis indicates a focus position Z.

In the example shown in FIG. 3A, at a position shown by an arrow P and at a position shown by an arrow Q, the focusing state is shown respectively. In the figure, a distance between the arrow P and the arrow Q (P–Q) corresponds to the thickness of the cover glass 52, and reference characters a and b are lock-in ranges in the focusing operation (focus lock-in range) respectively.

FIGS. 4A and 4B are diagrams showing a state in the focusing time of the observational optical system 10 respectively.

FIG. 4A shows the focusing state at the position of the arrow P in FIG. 3A. In FIG. 4A, a focal point fc of the observational optical system 10 is brought onto a surface $52a$ of the cover glass 52 placed on the frontward side (on the objective lenses 11, 11A, 11B side) of an observation object 51 such as a cell.

On the other hand, FIG. 4B shows the focusing state at the position of the arrow Q in FIG. 3A. In FIG. 4B, the focal point fc of the observational optical system 10 is brought onto a back surface $52b$ of the cover glass 52. When the observation object 51 is observed, the objective lens 11, 11A, 11B is pushed along the Z-axis for $\Delta Z$ (for example, about 1 to 10 μm), thereby the focal point fc is brought onto the observation object 51.

As shown in FIG. 3A, according to the biological microscope in this embodiment, an optical parameter of the focus error detecting optical system 20, 20A, 20B is determined so that curves of the focus error detection signals indicating the focusing states onto the front surface $52a$ and the back surface $52b$ of the cover glass 52 are separate from each other. Therefore, focus of the observational optical system 10 can be obtained on the observation object 51 exactly.

Further, in the microscope in this embodiment, the optical units 2, 2A and 2B having the optical parameters corresponding to the objective lenses 11, 11A, 11B are provided, and the optical unit 2, 2A, 2B (focus error detecting optical system 20, 20A, 20B) corresponding to the objective lens 11, 11A, 11B in use is used. Therefore, even in a case where any objective lens 11, 11A, 11B is used, the curve of the focus error detection signal as shown in FIG. 3A can be obtained at all time, and focusing accuracy is not lowered.

To the contrary, FIG. 3B shows an example of the focus error detection signal when the objective lens is switched to an objective lens having a low numerical aperture in a case where the optical system other than the objective lens is commonly used. In the example shown in FIG. 3B, since an S-curve of the focus error detection signal is broad, a curve indicating the focusing onto the back surface $52b$ of the cover glass 52 is absorbed in a curve of a great amplitude indicating the focusing onto the surface $52a$ of the cover glass 52, so that the focusing state onto the back surface $52b$ cannot be detected.

Figure 3C:
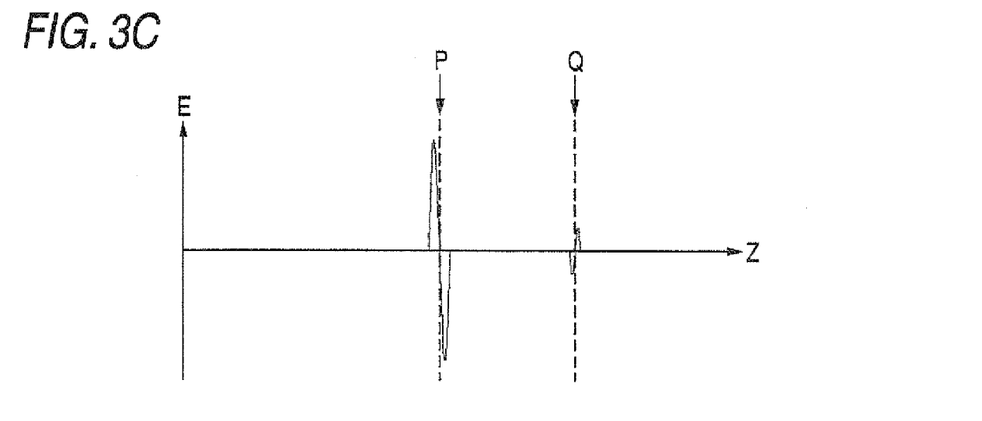
FIG. 3C is a diagram showing an example of a focus error detection signal the microscope in which the common optical system is used.

Further, FIG. 3C shows an example of the focus error detection signal when the objective lens is switched to an objective lens having a high numerical aperture in a case where the optical system other than the objective lens is commonly used. In the example shown in FIG. 3C, the focus lock-in range of the focus error detection is so narrow that the normal auto-focus operation cannot be acquired.

Further, in the microscope in this embodiment, correspondingly to the objective lens 11, 11A, 11B, the optical axis in each optical unit 2, 2A, 2B can be adjusted independently. Therefore, the optical axis shift of the focus error detecting optical system which is caused by switching the objective lens can be removed, and the operation for adjusting the optical axis can be made easy. Further, by optimizing the lens of the optical unit 2, 2A, 2B correspondingly to the objective lens, or optimizing a gain of the quadrant photodiode, the optimum curve of the focus error detection signal can be obtained at all time.

As described above, according to the microscope of the invention, since the focus error detecting optical system corresponding to the objective lens in use is selected, even in a case where the objective lens is switched, the optical parameter of the focus error detecting optical system can be always optimized, and an appropriate focus error detecting characteristic can be always acquired. Further, the optical axis shift which is caused by switching the objective lens can be also adjusted. Further, according to the microscope of the invention, it is also possible to obtain a biological microscope which is high in focusing performance.

An application range of the invention is not limited to the above embodiments. The invention can be widely applied to the microscope which has the auto-focus function of the observational optical system that uses the focus error signal.

It will be apparent to those skilled in the art that various modifications and variations can be made to the described preferred embodiments of the present invention without departing from the spirit or scope of the invention. Thus, it is intended that the present invention cover all modifications and variations of this invention consistent with the scope of the appended claims and their equivalents.

What is claimed is:

1. A microscope, comprising:
 a plurality of objective lenses in an observational optical system;
 a plurality of focus error detecting optical systems each having an optical parameter corresponding to a numerical aperture of the objective lenses respectively;
 a selecting section which selects the focus error detecting optical system corresponding to the objective lens being in use;
 a focusing section which brings a focal point of the observational optical system into a focus position by using a focus error signal obtained by the selected focus error detecting optical system,
 wherein each of the focus error detecting optical systems has the optical parameter which makes a focus lock-in range obtained by the focus error signal upon using the corresponding objective lens substantially be a constant value, and
 wherein each of the focus error detecting optical systems has the optical parameter which makes the focus lock-in range obtained by the focus error signal upon using the corresponding objective lens be the value capable of detecting a focus on a front surface of a cover glass and a focus on a back surface of the cover glass separately.

2. The microscope according to claim 1, wherein the focusing section brings the focal point of the observational optical system into the focus position of which basis is the back surface of the cover glass.

3. The microscope according to claim 1, wherein an astigmatic method is used in obtaining the focus error signal.

* * * * *